US005510205A

United States Patent [19]
Ozer

[11] Patent Number: 5,510,205
[45] Date of Patent: Apr. 23, 1996

[54] UNIVERSAL CAMCORDER BATTERY PACK

[76] Inventor: Yaacov Ozer, Flat 12, 9/Fl., Wing Fat Ind. Bldg., 12 Wang Tai Road, Kowloon Bay, Hong Kong

[21] Appl. No.: 36,537

[22] Filed: Mar. 22, 1993

Related U.S. Application Data

[63] Continuation-in-part of Ser. No. 910,486, Jul. 8, 1992, Pat. No. 5,227,262.

[51] Int. Cl.⁶ ..................................... H01M 2/10
[52] U.S. Cl. .................. 429/91; 429/98; 429/123; 429/99
[58] Field of Search .................. 429/96–100, 121, 429/123, 90; 307/150; 365/226, 229

[56] References Cited

U.S. PATENT DOCUMENTS

| | | |
|---|---|---|
| D. 347,822 | 6/1994 | Tong . |
| 4,515,872 | 5/1985 | Okano .......................... 429/65 |
| 4,829,224 | 5/1989 | Gandelman et al. . |
| 4,992,987 | 2/1991 | Echols et al. . |
| 5,122,927 | 6/1992 | Satou . |
| 5,149,603 | 9/1992 | Fleming et al. . |
| 5,180,644 | 1/1993 | Bresen et al. . |
| 5,227,262 | 7/1993 | Ozer ............................ 429/98 |
| 5,378,556 | 1/1995 | Yung ........................... 429/99 |

Primary Examiner—Anthony Skapars
Attorney, Agent, or Firm—Loeb and Loeb

[57] ABSTRACT

A universal camcorder battery pack for use with a number of different camcorder makes and models, including those most popular in the camcorder industry. Such a universal camcorder battery pack provides for both mechanical and electrical compatibility between the battery pack and standard footprints for the leading manufacturers of camcorders.

22 Claims, 5 Drawing Sheets

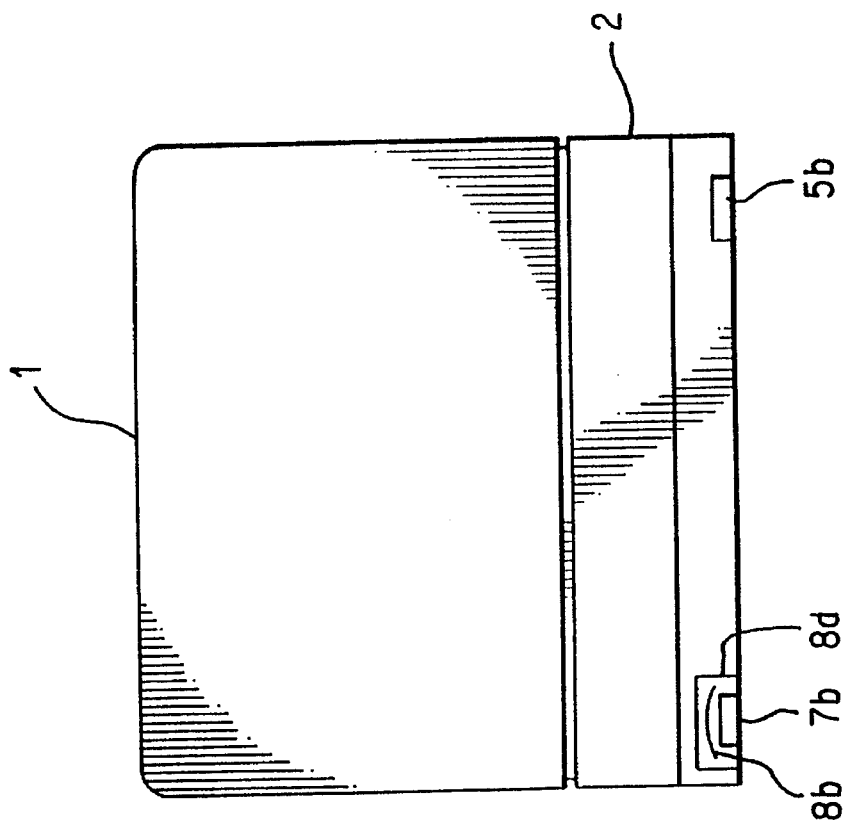
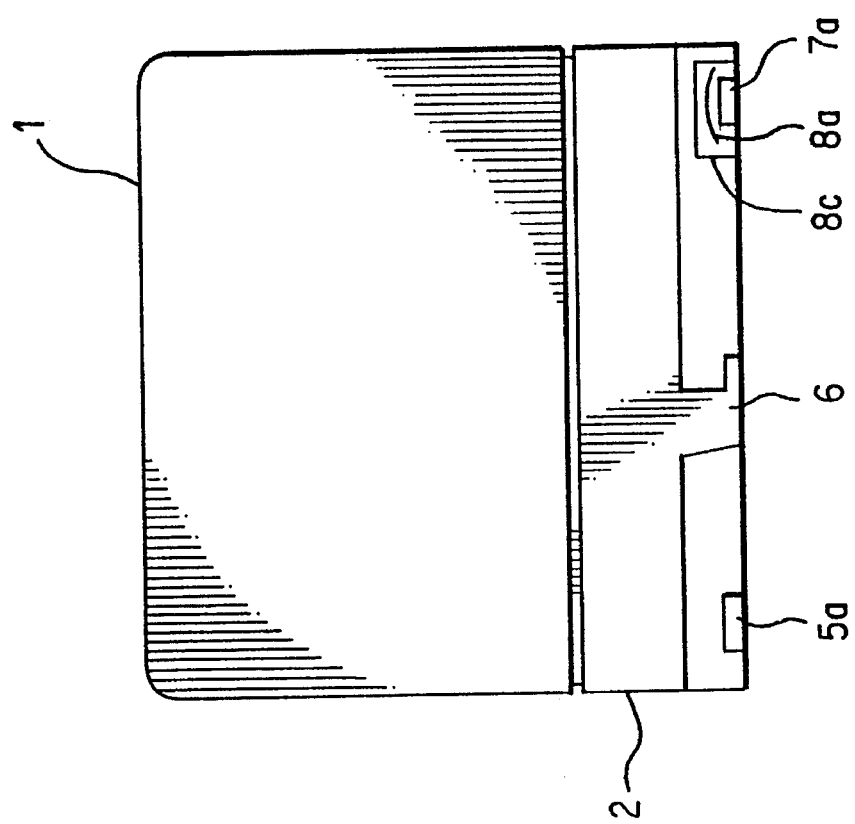
FIG. 4b
FIG. 4a

UNIVERSAL CAMCORDER BATTERY PACK

RELATED APPLICATIONS

This application is a continuation-in-part of U.S. patent application Ser. No. 07/910,486 filed on Jul. 8, 1992, now U.S. Pat. No. 5,227,262.

FIELD OF THE INVENTION

The present invention is directed to a universal camcorder battery pack for use with numerous commercially available camcorders. More particularly, the present invention is directed to a universal camcorder battery pack which is compatible with the four leading standards for camcorder batteries.

BACKGROUND OF THE INVENTION

Prior art camcorder battery packs are generally limited to use with a single brand of camcorder, or at most accommodate the base configurations of two brands of camcorders. Since camcorder battery packs can be expensive, the purchaser of a camcorder battery pack must be quite certain as to the manufacturer of the camcorder for which the battery pack is being purchased.

As the use of camcorders has proliferated, the footprint or base configuration of camcorder battery packs have tended to fall within one of four standard configurations. The footprints of the Hitachi, Panasonic, Sony and Sharp "Twin Cam" camcorder battery packs have become the "de facto" standards for the camcorder industry. For example, since Sony manufactures Ricoh camcorders, a Sony camcorder battery pack will fit a Ricoh camcorder. In order to properly function in a camcorder, the camcorder battery pack must have both mechanical and electrical compatibility with the camcorder in which it is used.

As the base configuration of camcorder battery packs generally falls along one of the above-discussed four standard configurations, suppliers of battery packs are still required to produce battery packs having footprints which fit each of the four standard configurations. The production of four separate camcorder battery pack models requires four different manufacturing procedures as well as separate mechanical and electrical components for each of the four models of battery packs. While camcorder battery packs which accommodate two of the four standard base configurations are available, a camcorder battery pack which accommodates the four major standard base configurations has not been known.

In addition to the difficulties of manufacturing four different camcorder battery packs having four separate base configurations, a purchaser of a camcorder battery pack must be aware of the precise base configuration needed in order to select the correct camcorder battery pack. If the purchaser of the camcorder battery pack is not the owner of the camcorder in which the battery pack will be used, (e.g., the battery pack is being purchased as a gift) this can create difficulty in selecting the appropriate battery pack.

Even more importantly, retailers must stock multiple battery pack types resulting in extraordinary inventory and floor space requirements and substantial increases in carrying costs.

The Canon camcorder battery has also emerged as another important battery contact standard. Thus, there are now at least five major camcorder battery contact standards that are in relatively common use. These standard battery formats are for the Sony, the Panasonic, the Hitachi/RCA, the Sharp "Twin Cam" and the Canon camcorders.

Although there are five common camcorder battery standard contact formats there are well over five battery recharger configurations. Rechargers are cheaper and easier to modify or redesign, so manufacturers often slightly redesign their rechargers and batteries to force the consumer to use only batteries produced by that particular camcorder manufacturer. The altered recharger still works with the batteries already produced by the manufacturer (i.e., using one of the five common camcorder battery contact standards). However, batteries which are not manufactured by the manufacturer may not work with the modified or redesigned battery recharger. Thus, a consumer must only buy batteries produced by the manufacturer who produced his charger, or take the risk that batteries produced by other manufacturers may work on his camcorder but not his recharger.

SUMMARY OF THE INVENTION

Accordingly, it is an object of the present invention to solve the above-mentioned difficulties associated with prior art camcorder battery packs and to produce a universal camcorder battery pack that can be suitably used in at least three, and preferably in each of the four standard base configurations without modification.

In addition, it is a more specific object of the present invention to provide a universal camcorder battery pack that provides for mechanical and electrical compatibility with each of the four standard base configurations discussed above.

It is yet another object of the present invention to provide a universal camcorder battery pack that provides for mechanical and electrical compatibility with at least five different standard sets of camcorder battery contacts.

It is a still further object of the present invention to provide mechanical and electrical compatibility with one or more battery recharger configurations for each different standard set of camcorder battery contacts.

These and other objects of the present invention will become clear from the detailed discussion below when taken into consideration with the drawings. It is to be understood that the following discussion is intended merely to illustrate the preferred embodiment of the present invention. However, the present invention is not limited to the illustrated embodiments, but is limited solely by the claims appended to this specification.

BRIEF DESCRIPTION OF THE DRAWINGS

FIGS. 4a and 4b are end views of the universal camcorder battery pack illustrated in FIG. 1.

Figure 1:
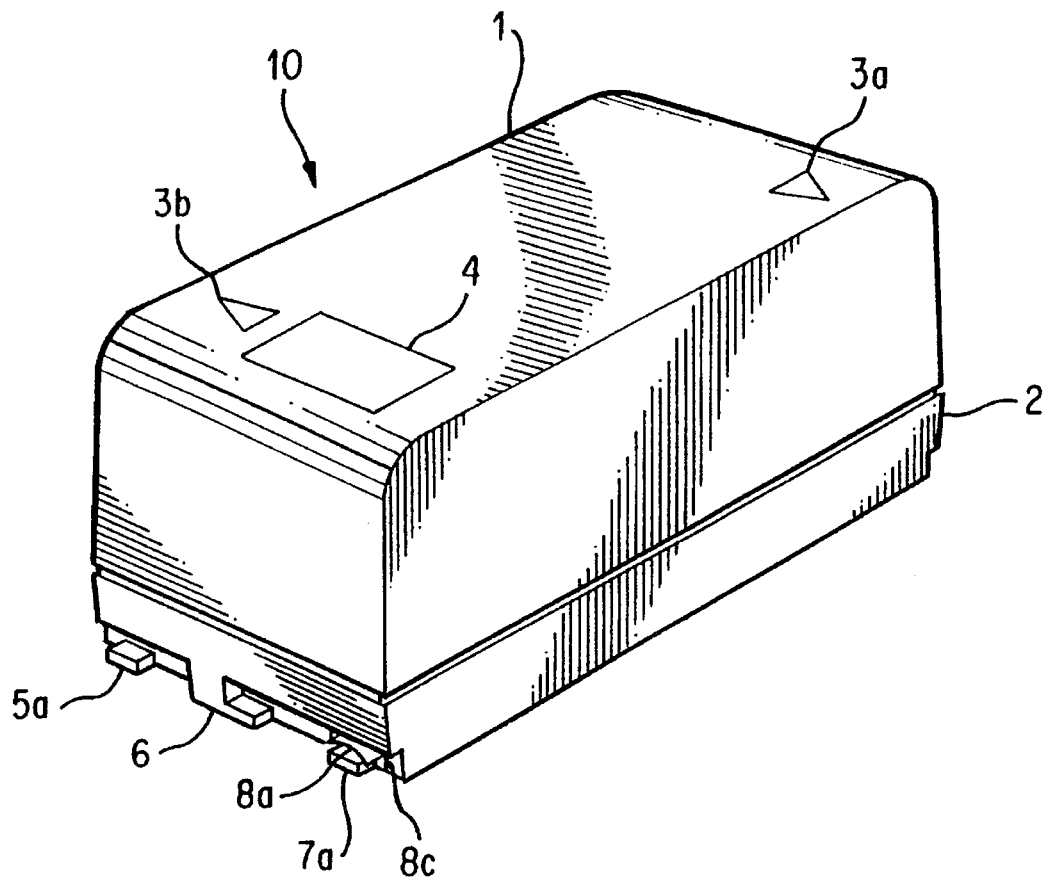
FIG. 1 is a plan view of the universal camcorder battery pack in accordance with an embodiment of the present invention.

DESCRIPTION OF THE PREFERRED EMBODIMENT:

FIG. 1 illustrates a preferred embodiment of the universal camcorder battery pack in accordance with the present invention. It is to be understood that the illustrations are not to be considered in a limiting sense, but are merely provided to illustrate a preferred embodiment of the invention. The invention is best defined by the claims appended to this description.

As can be seen in FIG. 1, a universal camcorder battery pack in accordance with one embodiment of the present invention includes upper and lower casings 1, 2. The upper and lower casings 1, 2 serve to contain rechargeable battery cells (not shown) which supply power to the camcorder (not shown) through contacts located in the base and end portions of the battery pack 10. The contacts will be discussed in more detail below. Disposed on an upper surface of the upper casing 1 are arrows 3a and 3b which are used to direct a user as to the proper placement of the universal camcorder battery pack 10 based on the type of camcorder for which it will be used. The arrows 3a and 3b provide alignment assistance depending on the type of camcorder. For example, arrow 3a could be utilized to direct a user when the camcorder battery pack 10 is being utilized with Sony, Sharp or Hitachi brand camcorders. Similarly, the arrow 3b can be utilized to direct a user of the camcorder battery pack 10 in association with Panasonic brand camcorders.

The universal camcorder battery pack 10 can include a display 4 to provide the user with an indication of remaining battery life. The display 4 can be any suitable form of display, including a liquid crystal display (LCD), a light emitting diode display (LED) or any other suitable display technology. The ability to provide an indication of the remaining battery life is well-known to those skilled in the art.

As can be seen in FIG. 1, and in more detail in FIGS. 4a and 4b, the camcorder battery pack 10 is provided with connecting members at respective ends of the battery pack 10. Connecting members 5a, 5b and 6 are utilized to interconnect with corresponding connecting member receptacles on the camcorder with which the battery pack 10 is used. The connecting members 5a, 5b, 6 assist in holding the battery pack 10 in place on the camcorder.

For certain types of camcorders, e.g., Hitachi brand camcorders and those which conform to the Hitachi connection standard, electrical connections are disposed on the ends of the battery pack 10. Referring to FIGS. 4a and 4b, the battery pack 10 is provided with protruding members 7a and 7b, with electrical contacts 8a and 8b being disposed above the protruding members 7a and 7b, respectively. The electrical contacts 8a and 8b also protrude from the body of the battery pack 10 approximately the same amount as the protruding members 7a and 7b and provide for the power supply to the camcorder. The electrical contacts 8a and 8b protrude from openings 8c and 8d, respectively, on the respective ends of the camcorder 10.

Figure 2:
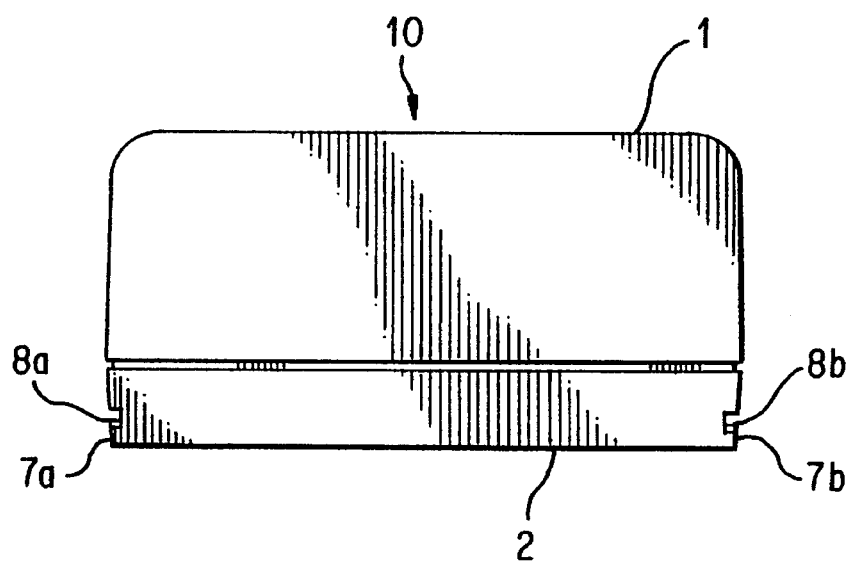
FIG. 2 is a side view of the universal camcorder battery pack shown in FIG. 1.

FIG. 2 provides a side view of the camcorder battery pack 10 illustrated in FIG. 1. As can be seen in FIG. 2, the protruding members 7a and 7b, in conjunction with the electrical contacts 8a and 8b, extend from the end of the battery pack 10 for interconnection with corresponding receptacles on the camcorder. In addition to providing electrical power to the camcorder, the protruding members 7a, 7b can assist in securing the camcorder battery pack 10 in place.

Figure 3:
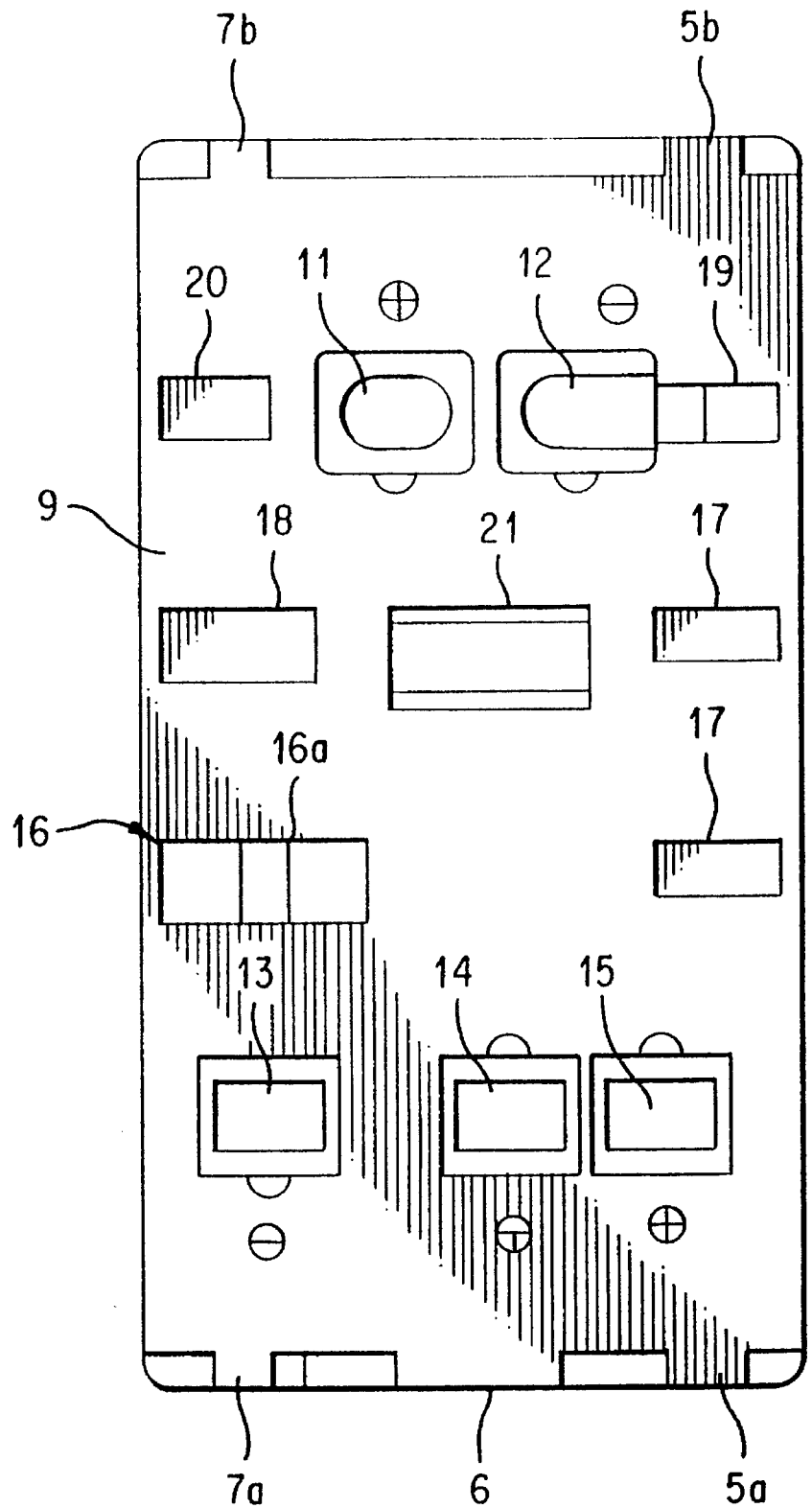
FIG. 3 is a bottom view of the universal camcorder battery pack illustrated in FIG. 1.

FIG. 3 provides a bottom view of the camcorder battery pack 10. The bottom 9 of the battery pack 10 includes a plurality of indentations which are provided to accommodate various projections on the different brands of camcorders for which the battery pack 10 is to be used. Thus, reference numerals 17, 18, 19, 20 and 21 illustrate indentations in the bottom 9 of the camcorder battery pack 10. The mating of the projections with the indentations assists to secure the battery pack 10 in place on the camcorder. In addition to the projection/indentation mating, a locking mechanism 16 which includes an indentation and a spring loaded locking latch 16a is disposed on the bottom 9 of the battery pack 10. The locking mechanism 16 serves to secure the battery pack 10 in place in a manner well known in the art.

The electrical contacts which supply power to the various camcorder models are illustrated as reference numerals 11, 12, 13 and 15. The positive and negative electrical contacts 11 and 12, which are also identified with "+" and "−" symbols, respectively, have hybrid configurations for utilization with camcorders conforming to both the Sony and Sharp standards for electrical connections. The positive and negative electrical contacts 13 and 15, which are also identified with "−" and "+" symbols, respectively, can be utilized for camcorders which follow the Panasonic standard for electrical connections. Reference numeral 14 refers to a temperature/charge sensor terminal "T" which is utilized by Panasonic camcorders. The temperature/charge sensor terminal 14 allows the camcorder to sense the temperature/charge of the battery pack in order to determine if a battery pack is over/under charged. With respect to camcorders which follow the Hitachi standard for electrical connections, as discussed above, such camcorders utilize the electrical connectors 8a and 8b illustrated in FIGS. 1, 2, 4a and 4b.

A universal camcorder battery pack having those features described above is capable of being used with the four major standard configurations for camcorder battery packs, i.e., Hitachi, Panasonic, Sony and Sharp "Twin Cam". As camcorder brands proliferate, the newer brand models generally follow one of the above-identified four standard connection configurations. Accordingly, a universal camcorder battery pack in accordance with the present invention is capable of being utilized with a majority of camcorders available on the market. Such a camcorder battery pack greatly eases retailer inventory burden as well as the burden on consumers of choosing the proper battery pack and assists manufacturers by requiring a single manufacturing facility and procedure to manufacture batteries which fit all the major brands of camcorders.

The second and third embodiments of the present invention have additional features and refinements over the first illustrated embodiment and will be described in detail below. Like reference numerals identify the same or similar elements identified in the first embodiment described above and illustrated in FIGS. 1–4.

Figure 5:
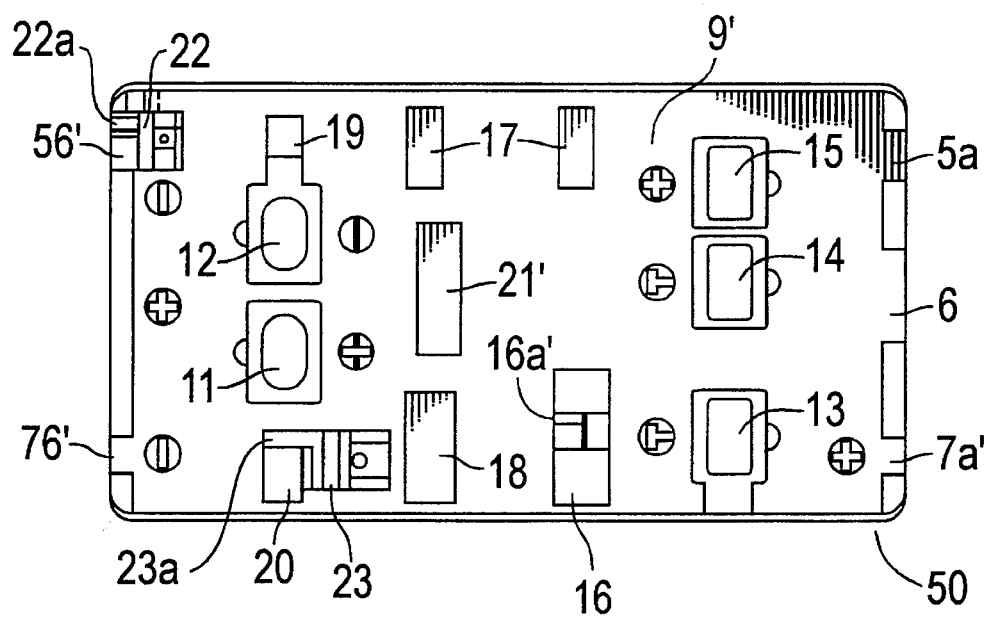
FIG. 5 is a bottom view of a second embodiment of the universal battery pack.
Figures 6A, 6B:
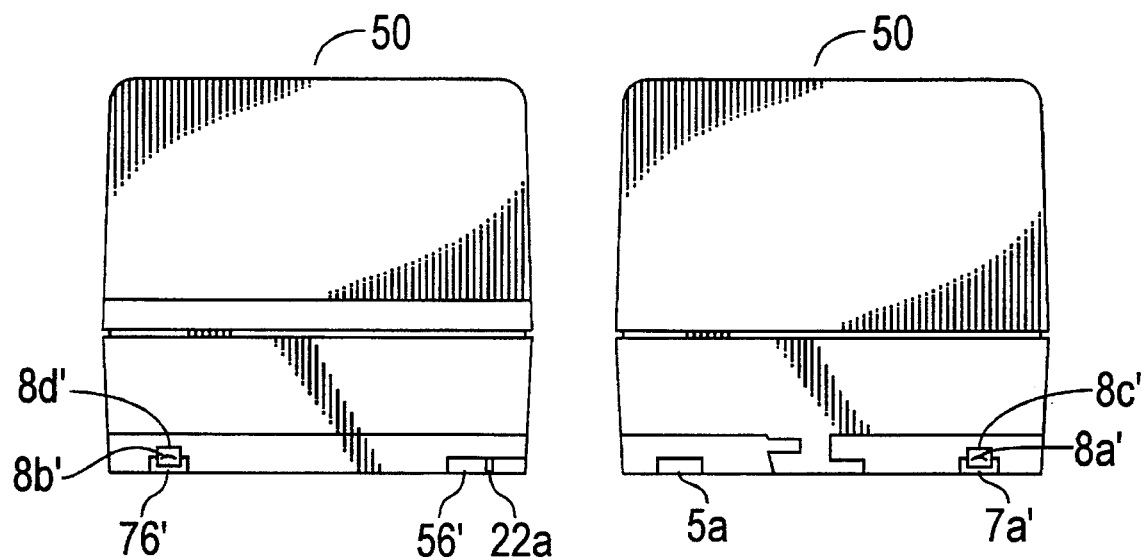
FIGS. 6a and 6b are end views of the second embodiment of the universal battery pack illustrated in FIG. 5.

The second embodiment of the present invention is illustrated in FIGS. 5 and 6. This configuration is usable with the same four camcorder battery standard contact formats that work with the first illustrated embodiment. However, FIGS. 6a and 6b show that the electrical contacts for use with the Hitachi camcorders have been modified to prevent catching of the contacts when inserting and removing the battery 50 in a Hitachi camcorder or battery recharger. Moreover, the contacts have been modified to make the camcorder battery 50 easier to use with the other camcorder battery standards. As shown in FIGS. 6a and 6b, the protruding members 7a' and 7b' have been altered to have a side lip which protects the electrical contacts 8a' and 8b' from being caught upon insertion and removal of the camcorder battery 50. Further, the electrical contacts 8a' and 8b' and openings 8c' and 8d' have been reduced in size to minimize interference with other camcorder formats and battery rechargers, for example, the Panasonic camcorder battery standard. The contacts 8a' and 8b' have rounded ends and curved contact surfaces, as shown in FIGS. 6a and 6b, to further protect the contacts. The modified contacts 8a' and 8b' perform exactly as those shown in FIG. 4, but should last longer and make the universal camcorder battery pack 50 easier to use.

Also modified in the second embodiment is the indentation 21' which is shown in FIG. 5. The indentation 21' has been modified to handle a greater variety of battery rechargers. However, it should be understood that the original indentations illustrated in the first embodiment may also be used on this embodiment of the camcorder battery 50.

In this embodiment, the locking mechanism 16 has been modified as shown in FIG. 5. The spring loaded locking latch 16a' has a portion of the latch removed to allow use with a greater number of camcorder battery rechargers. Although spring loaded locking latches, like 16a are known, the use of a spring loaded locking mechanism on universal camcorder batteries is new. The illustrated spring loaded locking mechanism 16a' allows the universal camcorder battery 50 to self-configure to some of the camcorder battery standards without the need for user input.

Connecting members 5a and 6 remain the same in the second embodiment. However, connecting member 5b' has been reduced slightly in size as shown in FIGS. 5 and 6a. The reduced size of member 5b' allows for the use of a configuration switch 22 having a tab 22a. The configuration switch 22 makes the battery bottom 9' compatible with more than one configuration of the Hitachi and RCA battery rechargers. The switch 22 changes the effective size of the connecting member 5b', such that the camcorder battery 50 is configured to work with another version of the Hitachi battery recharger; for example, a battery recharger that requires the smaller connecting member 5b' to permit seating of the battery 50. Normally, the switch 22 is positioned with the tab 22a retracted (not shown). In this position the camcorder battery 50 will work with the camcorder battery standard contact formats described in the first embodiment. If a Hitachi or a RCA recharger has a different connection structure, the switch 22 is repositioned to extend the tab 22a. This provides a lager effective connecting member comprised of connecting member 5b' and tab 22a and ensures that battery 50 makes contact with all of the activation switches on the battery recharger.

The second embodiment also uses a configuration switch 23 having a tab 23a, as shown in FIG. 5, which can partially cover indentation 20 on the battery bottom 9'. The configuration switch 23 makes the battery bottom 9' compatible with more than one configuration of the Panasonic battery rechargers. The switch 23 changes the effective size of the indentation 20, such that the camcorder battery 50 is configured to work with another version of the Panasonic battery recharger; for example, a battery recharger that requires a smaller indentation 20 to activate a contact on the battery recharger. Normally, the switch 23 is positioned with the tab 23a partially covering the indentation 20 to provide a smaller effective indentation. In this position, the camcorder battery 50 will work with the camcorder battery standard contact formats described in the first embodiment. If a Panasonic battery recharger has a different connection structure, the switch 23 is repositioned to retract the tab 23a and uncover the indentation 20 (not shown). This exposes the entire indentation 20 and ensures that camcorder battery 50 properly seats on the battery recharger. The above description clearly shows that the layout, size, number and combination of the indentations and the switches are critical to making the camcorder battery 50 universal.

Figure 7:
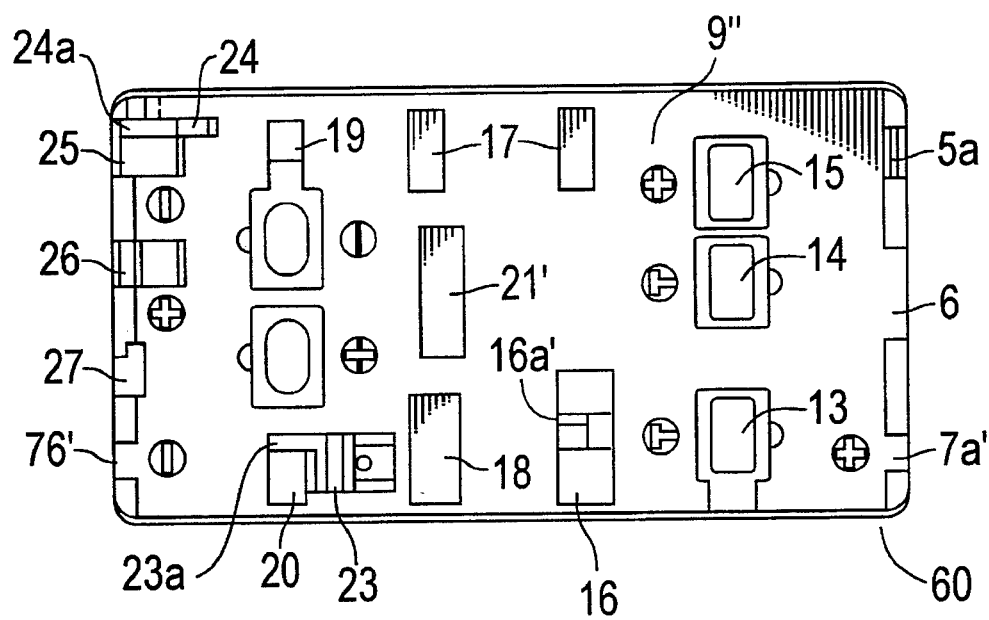
FIG. 7 is a bottom view of a third embodiment of the universal battery pack.
Figures 8A, 8B:
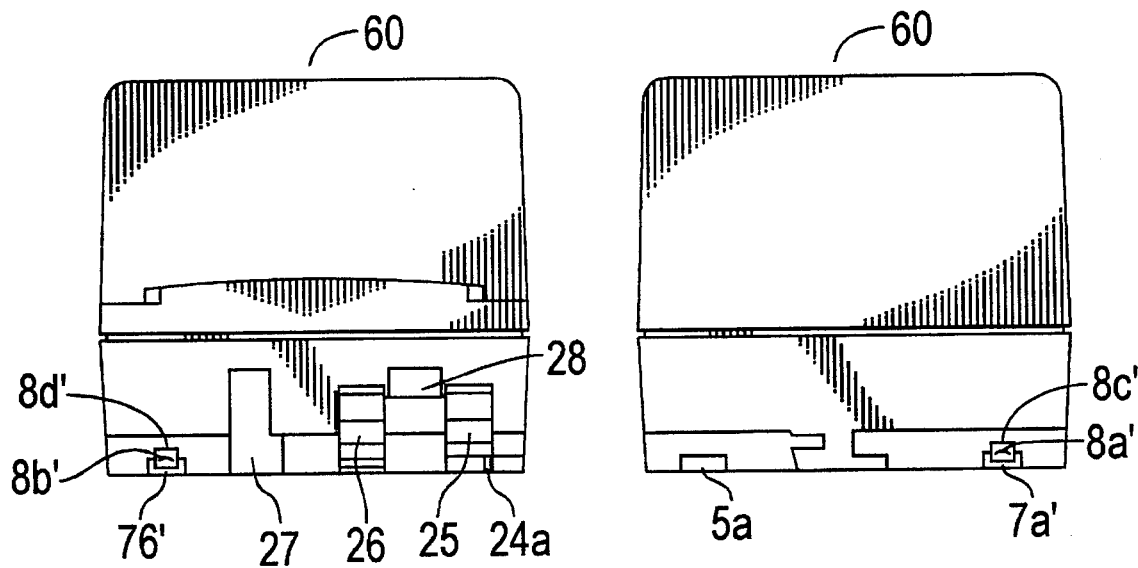
FIGS. 8a and 8b are end views of the third embodiment of the universal battery pack illustrated in FIG. 7.

The third embodiment of the present invention includes many of the elements described in the second embodiment. However, FIGS. 7 and 8 show that the camcorder battery 60 has an additional pair of electrical contacts 25 and 26, and a configuration switch 24 that serves the same purpose as configuration switch 22 described above. The additional electrical contacts 25 and 26 allow the camcorder battery 60 to be used with a fifth camcorder battery standard contact format (i.e., that used by Canon camcorders). The electrical contacts 25 and 26 are recessed as shown in FIGS. 7 and 8b to match up with the contacts on the Canon camcorders and battery rechargers.

Electrical contact 25 extends outward from the battery bottom 9" as shown in FIG. 7 to provide a connecting member which is the same size as connecting member 5b' described in the second embodiment. The configuration switch 24 is smaller than the configuration switch 22 to avoid interference with the contact 25 when the tab 24a is extended. Thus, the switch 24 is usually moved with a stylus. The switch 24 has a tab 24a which can be extended to serve the same purpose as tab 22a on switch 22 described above in the second embodiment. This preserves the ability of battery 60 to work with the same Hitachi camcorders and battery rechargers described with the second embodiment, while adding the capability of working with a fifth camcorder battery standard.

The camcorder battery 60 also has additional indentations 27 and 28 to match and facilitate connection to the Cannon camcorders and battery rechargers. These additional indentations further show that the layout, size, number and combination of the indentations and the switches are critical to making the camcorder battery 60 universal.

Although the present invention has been described in terms of preferred embodiments, above, numerous modifications and/or additions to the above-described preferred embodiment would be readily apparent to one skilled in the art. It is intended that the scope of the present invention extends to all such modifications and/or additions and that the scope of the present invention is limited solely by the claims set forth below.

What is claimed is:

1. A universal camcorder battery pack, comprising:
    a housing including a top, a base opposite to the top, a first end and a second end opposite to the first end;
    at least one battery enclosed within the housing; and
    a plurality of contacts disposed in the base and connected to the at least one battery, the plurality of contacts being adapted to be coupled to at least three different standard sets of camcorder contacts.

2. A universal camcorder battery pack according to claim 1, further comprising a locking device disposed in the base for locking the at least one battery pack in place on a camcorder.

3. A universal camcorder battery pack according to claim 1, wherein the plurality of contacts consist of a first, a second, and a third array of contacts, wherein the first array of contacts is adapted to being coupled to at least one camcorder standard, wherein the second array of contacts is adapted to being coupled with at least a second camcorder standard, and wherein the third array of contacts is adapted to being coupled to at least a third camcorder standard.

4. A universal camcorder battery pack according to claim 3, wherein the plurality of contacts further includes a fourth array of contacts, and wherein the fourth array of contacts is adapted to being coupled to at least a fourth camcorder standard.

5. A universal camcorder battery pack according to claim 3, wherein the first array of contacts is disposed in the base adjacent the first end, and the second array of contacts is disposed in the base adjacent the second end.

6. A universal camcorder battery pack according to claim 5, wherein the first and second array of contacts each include at least a positive and a negative electrical contact.

7. A universal camcorder battery pack according to claim 6, wherein the second array of contacts further includes a temperature sensor contact.

8. A universal camcorder battery pack according to claim 3, further comprising contact alignment identifying means for identifying a proper alignment of the battery pack in accordance with at least one of the at least three different standard sets of camcorder contacts.

9. A universal camcorder battery pack according to claim 3, further comprising battery life indicating means disposed in the housing for providing an indication of a state of charge of the at least one battery.

10. A universal camcorder battery pack according, to claim 3, wherein a protrusion is disposed on each of the first and second ends, and wherein the third array of contacts are disposed in the protrusions disposed on the first and second ends.

11. A universal camcorder battery pack according to claim 10, wherein the third array of contacts are protected by the protrusions on the first and second ends.

12. A universal camcorder battery pack according to claim 11, wherein the third array of contacts includes at least a positive and a negative electrical contact.

13. A universal camcorder battery pack according to claim 3, wherein the bottom is formed with recesses, and wherein the recesses are adapted to allow coupling of the at least one battery to the at least three different standard sets of camcorder contacts.

14. A universal camcorder battery pack, comprising:

a housing including a top, a base opposite to the top, a first end and a second end opposite to the first end;

at least one battery enclosed within the housing; and a plurality of contacts disposed in the base and connected to the at least one battery, the plurality of contacts being adapted to be coupled to at least five different camcorder standards;

wherein the plurality of contacts consist of a first, a second, a third and a fourth array of contacts, wherein the first array of contacts is adapted to be coupled to a first and second camcorder standard, wherein the second array of contacts is adapted to be coupled to a third camcorder standard, wherein the third array of contacts is adapted to be coupled to a fourth camcorder standard, and wherein the fourth array of contacts is adapted to be coupled to a fifth camcorder standard.

15. A universal camcorder battery pack according to claim 14, wherein the first array of contacts is disposed in the base adjacent the first end, and the second array of contacts is disposed in the base adjacent the second end.

16. A universal camcorder battery pack according to claim 15, wherein the first and second array of contacts each include at least a positive and a negative electrical contact.

17. A universal camcorder battery pack according to claim 16, wherein the second array of contacts further includes a temperature sensor contact.

18. A universal camcorder battery pack according to claim 14, further comprising contact alignment identifying means for identifying a proper alignment of the battery pack in accordance with the five different camcorder standards.

19. A universal camcorder battery pack according to claim 14, further comprising battery life indicating means disposed in the housing for providing an indication of a state of charge of the at least one battery.

20. A universal camcorder battery pack according, to claim 14, wherein a protrusion is disposed on each of the first and second ends of the housing, and wherein the third array of contacts is disposed in the protrusions disposed on the first and second ends.

21. A universal camcorder battery pack according to claim 20, wherein the third array of contacts is protected by the protrusions on the first and second ends.

22. A universal camcorder battery pack according to claim 14, further comprising a locking device disposed in the base for locking the battery pack in place on a camcorder.

* * * * *